United States Patent

[11] 3,604,584

| [72] | Inventor | Herbert C. Shank, Jr. |
| | | Lancaster, Ohio |
| [21] | Appl. No. | 831,939 |
| [22] | Filed | June 10, 1969 |
| [45] | Patented | Sept. 14, 1971 |
| [73] | Assignee | Anchor Hocking Corporation |
| | | Lancaster, Ohio |

[54] METHOD FOR PROTECTING GLASSWARE AND THE ARTICLE PRODUCED THEREBY
9 Claims, 6 Drawing Figs.

[52] U.S. Cl. ..................................................... 215/12 R, 40/310, 156/86
[51] Int. Cl. ..................................................... B65d 23/08
[50] Field of Search ........................................... 215/7, 1, 1.5, 12 R, 38 A, 100; 156/85, 86; 40/306, 310, 324; 206/65 S; 229/DIG. 12; 220/85 K

[56] References Cited
UNITED STATES PATENTS

| 845,777 | 3/1907 | Grossman | 220/85 K UX |
| 1,969,453 | 8/1934 | Churchill | 215/38 A X |
| 2,706,571 | 4/1955 | Ryan | 215/12 |
| 2,751,629 | 6/1956 | Dick | 215/38 A UX |
| 2,790,285 | 4/1957 | Pike | 156/86 UX |
| 2,821,155 | 1/1958 | Seckel | 215/38 A UX |
| 3,131,240 | 4/1964 | Kirkpatrick | 215/100 UX |
| 3,133,387 | 5/1964 | Harrison | 215/38 A UX |
| 3,331,521 | 7/1967 | Paige | 215/1 |
| 3,425,542 | 2/1969 | Bolen | 206/65 S |
| 3,480,168 | 11/1969 | Lee | 215/12 X |

*Primary Examiner*—Donald F. Norton
*Attorney*—Wood, Herron & Evans

ABSTRACT: A method for protecting glass articles such as jars and drink bottles from abrasion. Broadly the method comprises heat shrinking a thermoplastic material around a portion of the glass article. The portion includes the sidewall-bottom wall region.

PATENTED SEP 14 1971  3,604,584

INVENTOR.
Herbert P. Shank, Jr.
BY Wood, Herron & Evans
ATTORNEYS

METHOD FOR PROTECTING GLASSWARE AND THE ARTICLE PRODUCED THEREBY

BACKGROUND AND SUMMARY OF THE INVENTION

Glass derives its principal strength from an unblemished surface and any scratches or flaws which are present on the surface considerably decreases its strength; reductions in strength to as little as one-quarter of the original value not being uncommon. Maximum strength of glass articles is usually attained shortly after they are formed but because of the abrasion and scratching which occurs as a result of the articles coming in contact with each other and other surfaces, the strength is rapidly diminished. In the course of handling, packing and shipping, glassware articles frequently abrade, thereby producing scratches and mars on the surfaces. This problem is particularly acute in the food and beverage field wherein glass containers are subjected to various processing cycles. Bottles in contact with each other move on conveyor belts and are successively filled with the contents, closed and packaged for delivery. In these operations the bottles frequently come into contact with each other as well as mechanical equipment. Many times the bottles are also subjected to washing, sterilizing or vacuum treatments depending upon the particular products with which they are filled.

During each of these operations, the bottles continuously come in contact with each other and as they move from station to station, the chances of abrasion and surface scratches, mars and flaws increases. Reduction in strength of the bottles results from these abrasions. Breakage of bottles during these operations, particularly after the bottles are filled, represents additional problems to processors and adds to the total cost of the operations. To minimize the scratching and abrading of the glass surfaces during the manufacturing and processing operations, various attempts have been made in the past to coat the exterior glass surface with compositions to protect the surfaces or reduce the abrasion and scratching.

The patent art discloses many different types of lubricity coatings and many different techniques for applying them. U.S. Pat. Nos. 2,995,533, 3,362,843 and 3,415,673 are typical of such patents.

U.S. Pat. No. 2,995,533 discloses a process for applying a polyethylene emulsion to glass. The emulsion is then cured by subjecting the coated glass to a temperature of about 400° F.

U.S. Pat. No. 3,362,843 discloses a process for applying to glassware a primer prior to the application of an organic plastic coating. The plastic coating is applied by dipping or spraying and is thereafter fused. While this patent discloses an organic primer, inorganic primers are frequently applied also. Titanium tetrachloride is an example of such.

U.S. Pat. No. 3,415,673 discloses another lubricity agent which is applied to glassware by various means such as a fluidized bed, powder spray, flame spraying, electrostatic powder spray, or dipping.

Most of the heretofore-described lubricity agents and methods for applying them have commendable features. Unfortunately though, no one method and composition provides a totally satisfactory solution to all of the problems. For instance, in a commercial bottle-manufacturing operation where bottles are being produced at a rate of several hundred bottles per minute, ease and speed of application of the coating are two important criteria. It will be appreciated that in such an operation any elimination of manipulative steps would be significant. In an operation where a lubricity coating is applied other than by dipping, such as by spraying, total coverage of the ware is seldom obtained. There are areas which frequently receive no coating whatsoever. Satisfactory coverage of the bottom wall-sidewall region, an especially vulnerable portion, is seldom obtained by such methods.

Not only is coverage sometimes never achieved but frequently there is no satisfactory way to insure that a coating of uniform thickness is obtained over the entire surface of the bottle.

In many of these techniques it is very difficult to prevent the coating material from entering the container. Although many of the lubricity agents that are used have nontoxic properties and probably do not impart any flavor to the contents, many purchasers will not accept a glass bottle or jar for the packaging of food or beverages which include foreign substances. Even if the spray is kept from the interior of the glassware it frequently contacts the "finish" and later hampers the sealing or opening of the capped glassware.

It is also difficult in many of these methods to prevent the unsightly appearance of drips and air bubbles.

With these methods the storage of the required chemicals can become a problem. The frequent waste of the chemicals during their use adds to the per unit cost of the finished articles. In some processes air pollution is a problem.

The present invention solves many, if not all, of these problems. The invention includes the steps of encircling a portion of a bottle with a heat-shrinkable thermoplastic tube and shrinking the tube so that it tightly encircles the bottle. The length of the plastic tube or sheath is longer than the length of the sidewalls of the bottle so that it wraps around or shrinks in over a portion of the bottom of the bottle. The shrinking can be done in a vacuum chamber or by dipping in hot water so that air bubbles forming under the film are eliminated or greatly reduced. The sheath can include coloring material. It can also include ultraviolet absorbers to protect the contents against degradation by sunlight.

By covering the bottle with a thermoplastic sheath, in accordance with this invention, I eliminate many of the complicated and expensive steps heretofore needed to apply and harden the conventional, particulate lubricity materials. The messy dips and spraying techniques are eliminated. The attendant waste is also avoided. I have eliminated also the problems of interior contamination, improper coverage, and the appearance of surface defects. My method provides a coating, of uniform thickness which covers all desired portions of the glassware. Additionally, by applying the thermoplastic as a sheath and heat shrinking it to conform to the contour of the bottle, it has been found that the tendency of a filled bottle to break, or to explode outwardly under certain circumstances when coated with conventional lubricity agents, is greatly reduced. Usually, when the bottle does break many of the pieces are held together by the tube. Moreover, when such events do occur, the explosive forces are contained radially by the casing and are directed downwardly. Additionally, the present invention improves the thermal shock resistance of the protected container.

The present method is useful on glass articles such as narrow and wide neck bottles and jars, glass tumblers and glass vapor globes, etc. It is especially adapted for use on bottles which have a narrow neck portion, such as the type shown in the present drawings. In use these bottles are much more subject to wear at the mid and bottom regions than at the neck portion. Therefore, I apply my protective sheath so that it encircles these portions.

DESCRIPTION OF THE DRAWINGS

Referring now to the drawings, FIGS. 1–6, the following is shown.

DETAILED DESCRIPTION OF THE INVENTION

In practicing the present invention, those familiar with the art of heat shrink packaging will immediately recognize the number of different heat-shrinkable materials which are available for use in my process. Polyethylene, polypropylene, polyethylene terephthalate, and polyvinyl chloride are typical heat shrink plastics. I have found that polyvinyl chloride having a thickness of about 3 mils provides a satisfactory material.

I prefer to use the thermoplastic material in the form of a sheath or tube but, a sheet of thermoplastic could also be used. In the latter instance, the sheet would be wrapped around the bottle and the overlying portions sealed. The sheet would also be shrunk to surround the glassware. As used hereinafter the term sheath or tube is intended to include preformed tubes or tubes formed in situ by wrapping a sheet around the bottle and sealing it onto the article.

In order to shrink the sheath a source of heat is supplied. Infrared lamps may be used. Small electrically heated furnaces can also be used. When using such types of heating elements it may be possible to minimize the formation of air bubbles by heating the sheath in a vacuum of about 20 mm. of mercury.

I have also found that polyvinyl chloride tubes may be shrunk by immersing the bottle and sheath into a hot water bath. Alternatively, shrinking can be effected with steam.

Figure 4:
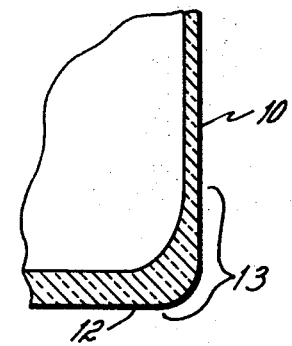
FIG. 4 is an enlarged cross-sectional view showing the thickened portion of a sidewall and bottom wall of a conventional bottle.

Referring now to the drawings, and more particularly to FIG. 4, there is shown there a cross section of the sidewall 10 and bottom walls 12 of a conventional soft drink bottle. The glass at this region 13, hereinafter referred to as the sidewall-bottom wall region, is ordinarily made thicker than the glass throughout the other portions of the bottle in order to increase the strength of the bottle at this location. Typically, thickness at the region 13 may be three times the wall thickness in an ordinary returnable beer bottle. This area is one of the most critical with respect to breakage. When the bottle is lowered into contact with a surface this area is especially vulnerable. Of course, thickening the bottle does increase its cost of manufacture and its weight.

Figure 5:
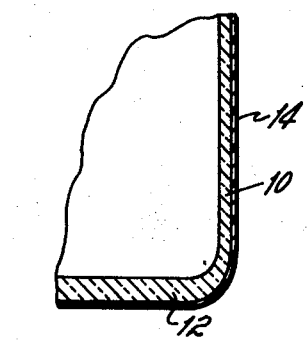
FIG. 5 is an enlarged cross-sectional view showing the thickened portion of a sidewall and bottom wall of a conventional bottle.

Referring now to FIG. 5, there is shown a cross-sectional view, the sidewall 10 and bottom wall 12 of a bottle that has been provided with a protective sheath 14 applied as more fully described below. The sheath 14 not only covers the sidewall 10 but also a portion of the bottom wall 12, i.e., the sidewall-bottom wall region 13. The sheath 14 does not, however, totally cover the bottom wall 12.

FIG. 4 illustrates how the thickness of a bottle to which my protective sheath 14 is to be applied, may be reduced at this critical region 13. In order to do this though it is important that the film covers a portion of about 75 percent of the radius of curvature of the sidewall-bottom wall region.

Figure 6:
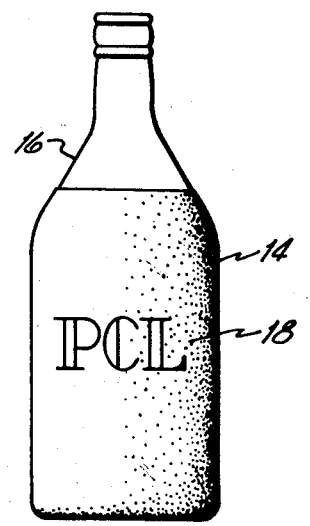
FIG. 6 is an elevational view showing a bottle with a labeled protective sheath.

Referring to the FIG. 6, there is shown there a bottle 16 having my protective sheath 14 applied thereto. It will be noted that the protective sheath 14 bears the printed indicia "PCL" 18. The sheath 14 may be printed, by conventional techniques, on the inside or outside of the tube, either before or after the sheath 14 is heat shrunk onto the bottle. Printed thermocontractive labels for cans are shown in U.S. Pat. No. 3,110,554. By so printing the sheath 14 the need for providing a conventional paper label is eliminated. Alternatively, if conventional labels, paper and foil, are applied to the bottle, the protective sheath serves to protect them against the hazards encountered in filling and handling.

I shall now describe the process by which I have successfully manufactured the bottles just described. It will be realized by those skilled in the art that an appreciation of the process will, of course, result in the appreciation of many different types of apparatus that may be used. Also it will be realized that my process is applicable to other types of containers.

EXAMPLE 1

In one method, protective sheath or tube 14, made from a thermocontractive polyvinyl chloride film, having a thickness of about 3 mils was used. It had been formed by a conventional technique. The bottle was of a conventional shape. The length of the sheath was slightly greater than the distance from points 18 to 20. The diameter of the sheath was slightly greater than the diameter of the bottle so that the tube could be easily slid over the bottle but yet when shrunk would tightly encircle the bottle.

Figure 1:
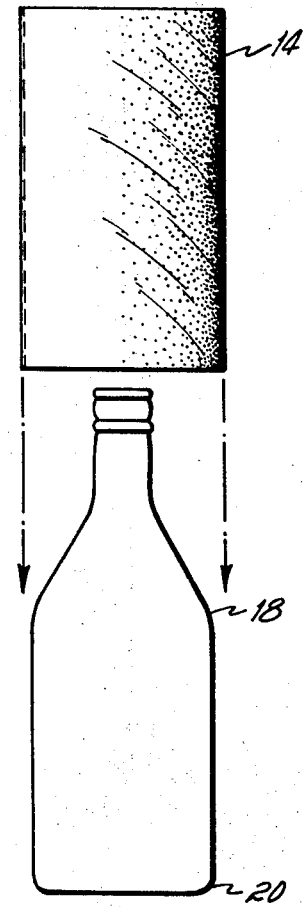
FIG. 1 is an exploded elevational view of a bottle showing the thermoplastic sheath about to be placed around the bottle.
Figure 2:
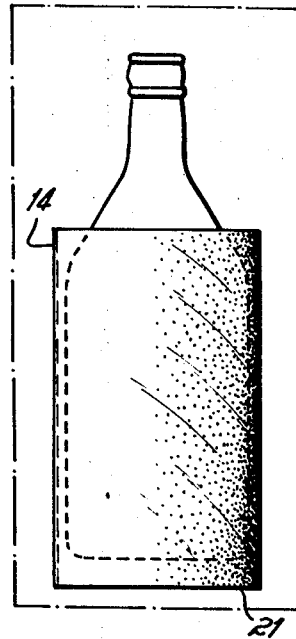
FIG. 2 is an elevational view showing the thermoplastic sheath loosely encircling a portion of the bottle, in a vacuum chamber, prior to the heat shrinking step.
Figure 3:
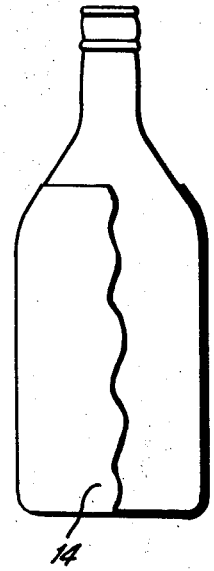
FIG. 3 is an elevational view with a portion of the sheath removed, showing the thermoplastic sheath heat shrunk around the side of the bottle and partially around the bottom of the bottle.

The sheath 14 was slid axially over the bottle, as shown in FIG. 2. The temperature of the bottle was approximately 80° F. The end 21 of the tube 14 extended slightly below the bottom wall 12 of the bottle. The tube and bottle were then immersed in a bath of water which had previously been heated to 180° F. In several minutes the bottle was withdrawn. The sheath 14 had shrunk and was firmly adhered to the bottle 16. The end 21 of the sheath 14 had shrunk so that it covered a portion of the bottom wall 12.

To test the effectiveness of my process as compared to the prior art methods I conducted the following tests. I subjected a quantity of bottles treated in various ways, including bottles protected in accordance with the technique described in the example above, to abrasion forces believed to be similar to those received in a typical bottle-handling operation. The bottles and fragments were then inspected for incidents of sidewall origin breaks. The bottles were also subjected to a hydrostatic pressure test and the average pressure at the time of rupture recorded. Table 1 shows the types of bottles tested and the results. It can be readily seen that bottles treated in accordance with my method are far superior in resistance to abrasion than to bottles treated by the other methods.

TABLE 1

| Type of Treatment | Incidents of Sidewall Origin Breaks | Hydrostatic Pressure |
| --- | --- | --- |
| Pristine Glass Bottles | 12 | 170.5 |
| Sprayed On Polyethylene Coating | 9 | 231.2 |
| Titinate Primer Coating Plus Sprayed On Polyethylene Coating | 3 | 246.8 |
| Coated in Accordance With The Instant Process | 0 | 278.1 |

Pristine bottles which were not subject to the abrasion tests displayed a strength of 302.1 and showed four incidents of sidewall origin breaks.

EXAMPLE 2

Instead of polyvinyl chloride film, polyethylene film can be used. For example, a polyethylene tube 14, of the thermocontractive type and having a thickness of about 3 mils, can be shrunk around a bottle 16 in the following manner. The tube 14, having a length slightly greater than the distance 18 to 20, is placed around the bottle, as shown in FIG. 2. The heat shrinking can be carried out in a heated vacuum chamber, evacuated to a pressure of about 20 mm. of mercury. This helps to eliminate the formation of air bubbles. After the tube is shrunk, the bottle is removed from the heated vacuum chamber. In commercial production the use of a vacuum chamber would probably not be as desirable as other available methods.

Having described my invention I claim:

1. An article of manufacture comprising in combination:

an article of glass having sidewalls and a bottom wall, said sidewalls connected to said bottom wall, and a protective sheath encircling said glass article and contacting a major portion of the sidewalls of said article and at least a minor portion of said bottom wall immediately adjacent said sidewalls, said protective sheath being formed from a heat-shrinkable material and heat shrunk into contact with said portions of the sidewalls and bottom wall.

2. The article of claim 1 wherein said heat-shrinkable material is a member selected from the group consisting of polyvinyl chloride, polyethylene, polypropylene and polyethylene terephthalate.

3. The article of claim 2 wherein said sheath has a thickness of approximately 3 mils.

4. The article of claim 1 wherein said glass container is a narrow neck bottle.

5. A process for protecting a glass article having sidewalls connected to a bottom wall, from abrasion comprising the steps of encircling a portion of a glass article with a heat-shrinkable sheath, and heating said sheath to shrink it into contact with said glass article, said sheath tightly encircling a portion of the article including a major portion of the sidewalls and at least a minor portion of the bottom wall immediately adjacent said sidewalls.

6. The process of claim 5 wherein said heat-shrinkable sheath is a member selected from the group consisting of polyvinyl chloride, polyethylene, polypropylene and polyethylene terephthalate.

7. The process of claim 6 wherein said sheath has a thickness of about 3 mils.

8. The process of claim 5 wherein said glass article is a narrow neck bottle.

9. A process for protecting a cylindrical glass article having sidewalls connected to a bottom wall, without the use of conventional lubricity coatings consisting essentially of the steps of 1. encircling a major portion of the sidewalls of said article with a thermoplastic tube,
2. positioning said tube so that it extends slightly beyond the bottom wall of the article,
3. heating said tube to shrink it into intimate contact with said article, said sheath covering a major portion of the sidewalls of said article and a minor portion of the bottom wall of said article immediately adjacent said bottom wall.